(12) United States Patent
Ahn et al.

(10) Patent No.: US 9,956,852 B2
(45) Date of Patent: May 1, 2018

(54) AIR VENT APPARATUS FOR VEHICLE (71) Applicants: Hyundai Motor Company, Seoul (KR); Kia Motors Corporation, Seoul (KR); Nifco Korea Inc., Asan-si (KR); Hyundai Mobis Co., Ltd., Seoul (KR)

(72) Inventors: Gye Young Ahn, Seoul (KR); Jae Whoan Park, Cheonan-si (KR); Kwanwoo Lee, Busan (KR); Ji-Won Lee, Cheonan-si (KR)

(73) Assignees: Hyundai Motor Company, Seoul (KR); Kia Motors Corporation, Seoul (KR); Nifco Korea Inc., Asan-si (KR); Hyundai Mobis Co., Ltd., Seoul (KR)

( * ) Notice: Subject to any disclaimer, the term of this patent is extended or adjusted under 35 U.S.C. 154(b) by 159 days.

(21) Appl. No.: 14/941,915

(22) Filed: Nov. 16, 2015

(65) Prior Publication Data
US 2016/0375746 A1 Dec. 29, 2016

(30) Foreign Application Priority Data
Jun. 26, 2015 (KR) .......................... 10-2015-0091366

(51) Int. Cl.
*B60H 1/34* (2006.01)
(52) U.S. Cl.
CPC ... *B60H 1/3421* (2013.01); *B60H 2001/3471* (2013.01)
(58) Field of Classification Search
CPC ......... B60H 1/34; B60H 1/3421; B60H 1/345
See application file for complete search history.

(56) References Cited

U.S. PATENT DOCUMENTS

| 3,802,328 | A | * | 4/1974 | Kakizaki | B60H 1/3442 137/601.05 |
| 5,690,550 | A | * | 11/1997 | Mikowski | B60H 1/345 454/155 |
| 9,278,607 | B2 | * | 3/2016 | Zalan | B60H 1/3421 |
| 2002/0081965 | A1 | * | 6/2002 | Demerath | B60H 1/3421 454/254 |

(Continued)

FOREIGN PATENT DOCUMENTS

| JP | 3958030 B2 | 8/2007 |
| KR | 20-1999-005722 u | 2/1999 |

(Continued)

*Primary Examiner* — Steven B McAllister
*Assistant Examiner* — Jonathan Cotov
(74) *Attorney, Agent, or Firm* — Morgan, Lewis & Bockius LLP (57) ABSTRACT

An air vent apparatus for a vehicle, which is disposed to supply air into an interior of a vehicle may include a duct housing opened at front and rear sides thereof, at least one blade disposed at a rear side in the duct housing horizontally in a width direction of the vehicle, and having both ends rotatably coupled, a knob mounted on one blade among the at least one blade so as to be slidable in the width direction of the vehicle and a front and rear direction of the vehicle, and adjust an angle of the blade, and a diffuser device mounted in the duct housing at a position spaced apart from a front side of the blade, connected with the knob, adjusting an angle in a left and right direction, and selectively diffusing the supplied air in accordance with a manipulation of the knob.

12 Claims, 7 Drawing Sheets (56) References Cited

U.S. PATENT DOCUMENTS

| | | | | |
|---|---|---|---|---|
| 2002/0094774 A1* | 7/2002 | Demerath | ............... | F24F 13/15 |
| | | | | 454/320 |
| 2004/0171344 A1* | 9/2004 | Krause | ................. | B60H 1/3421 |
| | | | | 454/315 |
| 2005/0048905 A1* | 3/2005 | Yang | .................... | B60H 1/3421 |
| | | | | 454/155 |
| 2013/0149952 A1* | 6/2013 | Demerath | ............ | B60H 1/3421 |
| | | | | 454/155 |
| 2013/0225058 A1* | 8/2013 | Ross | ....................... | B60H 1/34 |
| | | | | 454/155 |
| 2014/0308889 A1* | 10/2014 | Oe | ......................... | F24F 13/15 |
| | | | | 454/315 |
| 2014/0364045 A1* | 12/2014 | Noichl | ................ | B60H 1/3421 |
| | | | | 454/155 |
| 2016/0114654 A1* | 4/2016 | Lee | ..................... | B60H 1/3414 |
| | | | | 454/155 |

FOREIGN PATENT DOCUMENTS

| | | |
|---|---|---|
| KR | 10-2015-0068900 A | 6/2015 |
| KR | 10-1526808 B1 | 6/2015 |

\* cited by examiner

AIR VENT APPARATUS FOR VEHICLE

CROSS-REFERENCE TO RELATED APPLICATION

The present application claims priority to Korean Patent Application No. 10-2015-0091366 filed Jun. 26, 2015, the entire contents of which is incorporated herein for all purposes by this reference.

BACKGROUND OF THE INVENTION

Field of the Invention

The present invention relates to an air vent apparatus for a vehicle, and more particularly, to an air vent apparatus for a vehicle, which is capable of diffusing and supplying air, including cold air or warm air being supplied into an interior of a vehicle, at a front side of a user through a simple manipulation by the user, and adjusting various discharge directions.

Description of Related Art

In general, a heating, ventilating, and air conditioning (HVAC) apparatus is provided to supply warm air or cold air into an interior of a vehicle for the purpose of heating or cooling the interior of the vehicle and for the purpose of ventilation, and an air vent apparatus is provided to adjust the amount and the direction of the air controlled by the HVAC apparatus.

In the air vent apparatus, a plurality of horizontal blades and a plurality of vertical blades are installed to overlap each other in a grid shape in a duct that is opened at front and rear sides thereof.

The air vent apparatus, which is configured as described above, includes a knob for adjusting angles of the horizontal and vertical blades, and a driver or an occupant manipulates the knob to adjust the inclination angles of the blades such that a direction of air blown from a blower device is adjusted, and then the air is discharged to the interior of the vehicle.

However, the air vent apparatus in the related art has a problem in that air including cold air or warm air is supplied only in a rectilinear direction at a position where the inclination angle of the blade is formed.

In addition, in a case in which the blade is directed toward a front side of the user, cold air or warm air blows directly onto the user, and as a result, the user may feel unpleasant if the cold or warm air blows directly onto the user over a long period of time.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an air vent apparatus for a vehicle, which is capable of diffusing and supplying air including cold air or warm air at a front side of a user through a simple manipulation of a knob by the user, and adjusting various discharge directions.

According to various aspects of the present invention, an air vent apparatus for a vehicle, which is disposed to supply air including cold air or warm air into an interior of a vehicle may include a duct housing opened at front and rear sides thereof, at least one blade disposed at a rear side in the duct housing horizontally in a width direction of the vehicle, and having both ends rotatably coupled, a knob mounted on one blade among the at least one blade so as to be slidable in the width direction of the vehicle and a front and rear direction of the vehicle, and adjust an angle of the blade, and a diffuser device mounted in the duct housing at a position spaced apart from a front side of the blade, connected with the knob, adjusting an angle in a left and right direction, and selectively diffusing the supplied air in accordance with a manipulation of the knob.

Three blades may be provided to be spaced apart from each other in a vertical direction at the rear side in the duct housing, front ends of the blades may be rotatably connected through a connecting member, and the knob may be mounted on the blade disposed at a center.

The diffuser device may include a rotary link having upper and lower portions that are rotatably mounted in the duct housing at a front side of the knob, and connected with the knob, a connecting rod formed integrally with the rotary link at a front side of the rotary link, and having both end portions formed to be bent toward the front side of the duct housing, and fan assemblies having upper and lower portions that are rotatably mounted in the duct housing at a front side of the connecting rod, and are connected with the connecting rod.

The rotary link may include a slot formed in the vertical direction, and the rotary link may be connected with the knob in a state in which a mounting portion formed at the front side of the knob is inserted into the slot.

The slot may be formed to be rounded from the rear side toward the front side of the duct housing.

Both ends of the connecting rod, which are based on the rotary link may extend toward left and right sides in the width direction of the vehicle, respectively.

Both ends of the connecting rod may be formed to be bent corresponding to the fan assemblies, and connecting balls may be formed integrally with both bent ends of the connecting rod.

The fan assembly may include an outer housing having central portions of upper and lower portions rotatably mounted in the duct housing, at least one sliding groove formed in an inner circumferential surface thereof, and at least one insertion groove formed along a circumference at a front side of the outer housing, a sliding housing slidably inserted into the outer housing, and having at least one guide protrusion formed on an outer circumferential surface corresponding to the sliding groove, and a boss portion formed at a center of the sliding housing, supported by a plurality of ribs formed in a radial direction, and connected to the connecting rod, and a plurality of fan blades having upper and lower portions at a rear end thereof that is rotatably connected to the inner circumferential surface of the sliding housing and the boss portion, respectively, at the front side of the sliding housing, corresponding to the ribs, respectively, and having insertion protrusions that integrally protrude toward the outside of the sliding housing, corresponding to the insertion grooves.

The insertion groove may include an insertion portion formed in a straight line shape from the front side toward the rear side of the outer housing, and a bent portion formed to be bent at a predetermined angle from the insertion portion toward the rear side of the outer housing.

When the knob is pulled rearward in the interior of the vehicle, the fan blade may be configured to be moved together with the sliding housing that is moved to a predetermined degree from the outer housing toward the rear side of the vehicle, an angle of a front end of the fan blade may be changed in the width direction of the vehicle as the insertion protrusion is rotated while being inserted into the bent portion from the insertion portion, and the supplied air may be diffused and then supplied into the interior of the vehicle.

When the knob is in a home position, the fan blade may be positioned on a same line as the rib, and may be configured to concentrate the supplied air and then supply the air into an interior of the vehicle.

Eight ribs may be formed to be spaced apart from each other at an angle of 45° along an outer circumferential surface of a boss portion.

Eight fan blades may be formed to be spaced apart from each other at an angle of 45° along an outer circumferential surface of a boss portion.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
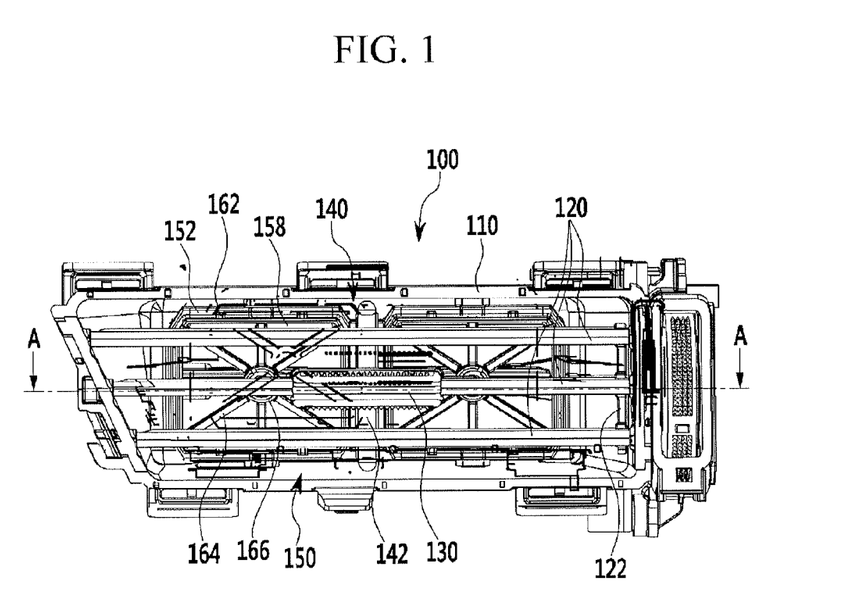
FIG. 1 is a front view of an exemplary air vent apparatus for a vehicle according to the present invention.
Figure 2:
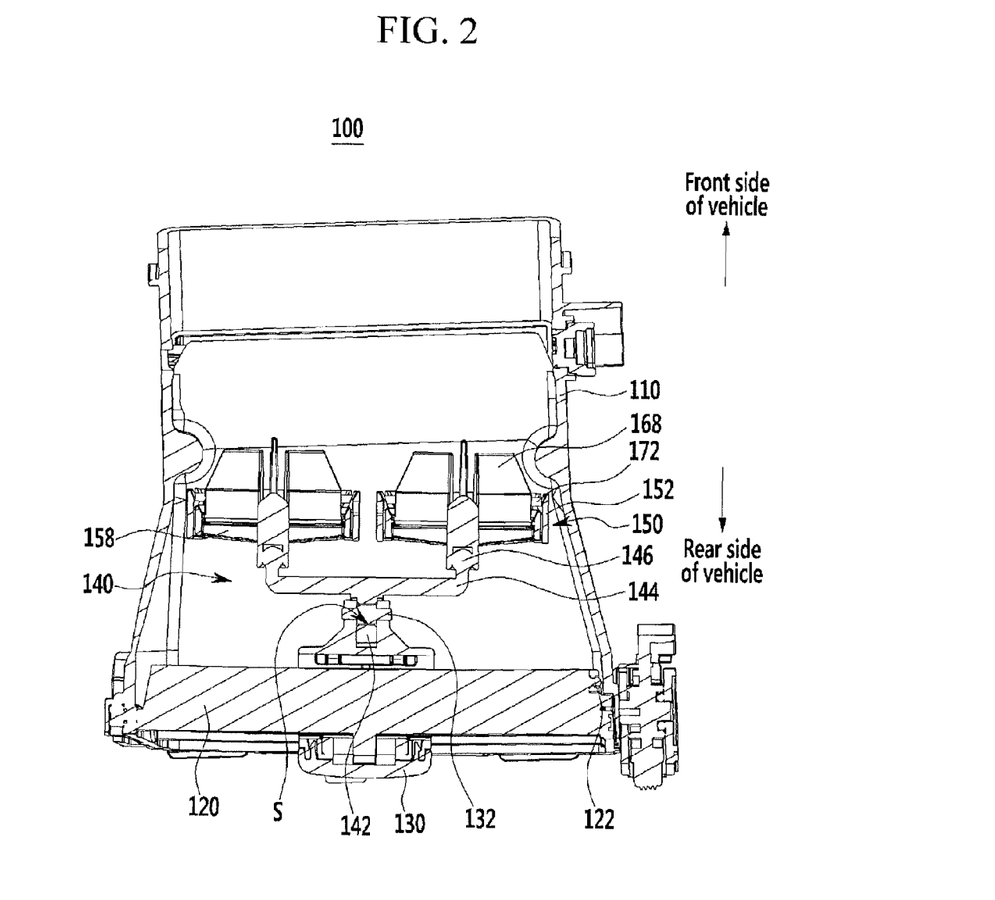
FIG. 2 is a cross-sectional view taken along line A-A of FIG. 1.
Figure 3:
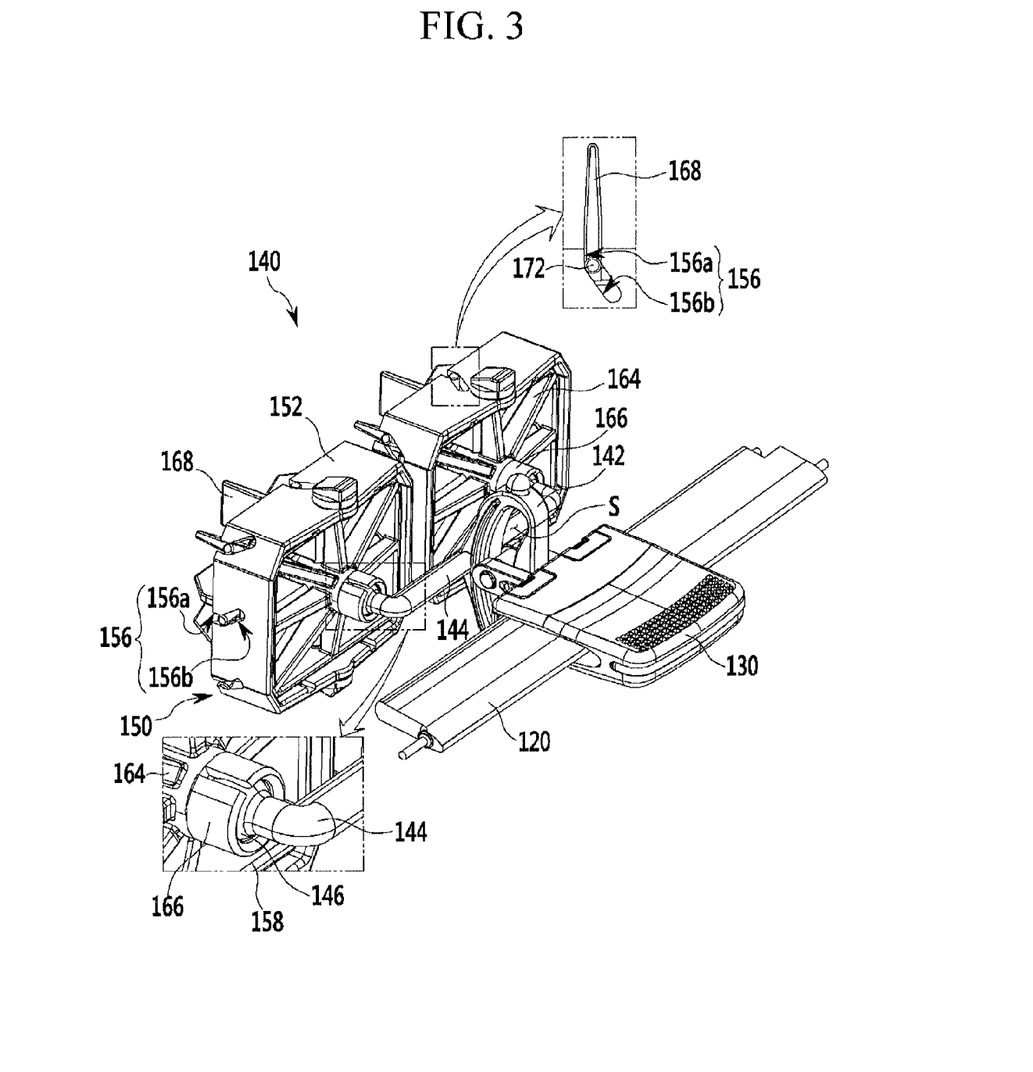
FIG. 3 is a perspective view of a diffuser device applied to the exemplary air vent apparatus for a vehicle according to the present invention.
Figure 4:
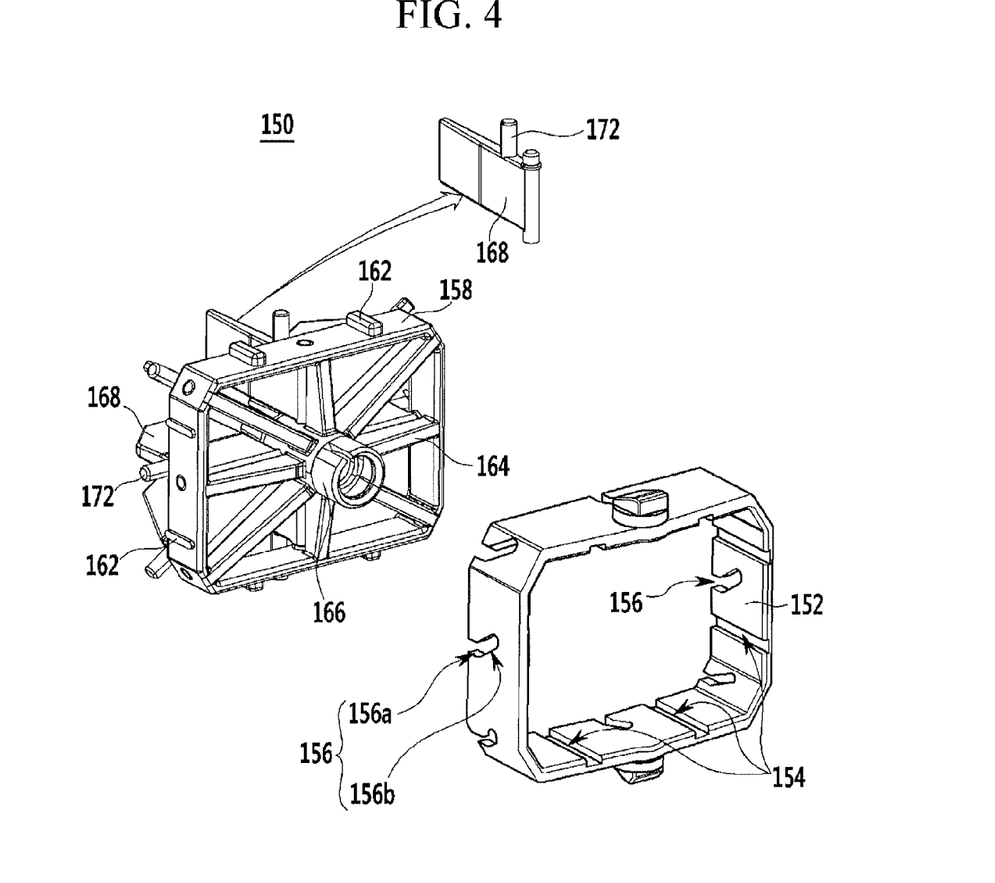
FIG. 4 is an exploded perspective view of a fan assembly of the diffuser device according to the present invention.

FIG. 1 is a front view of an air vent apparatus for a vehicle according to various embodiments of the present invention, FIG. 2 is a cross-sectional view taken along line A-A of FIG. 1, FIG. 3 is a perspective view of a diffuser device applied to the air vent apparatus for a vehicle according to various embodiments of the present invention, and FIG. 4 is an exploded perspective view of a fan assembly of the diffuser device according to various embodiments of the present invention.

Referring to the drawings, an air vent apparatus 100 for a vehicle according to various embodiments of the present invention may diffuse and supply air including cold air or warm air to a front side of a user through a simple manipulation of a knob 130 by the user, and may adjust various discharge directions.

To this end, as illustrated in FIGS. 1 to 4, the air vent apparatus 100 for a vehicle according to various embodiments of the present invention is installed to blow and supply air including cold air or warm air into the interior of the vehicle from a heating, ventilating, and air conditioning (HVAC) apparatus, and includes a duct housing 110, blades 120, the knob 130, and a diffuser device 140.

First, the duct housing 110 is opened at front and rear sides thereof based on a front and rear direction of the vehicle.

The duct housing 110 discharges air, which is supplied from the front side opened toward an engine room, toward the opened rear side disposed in the interior of the vehicle.

Here, the 'front side' means a direction toward a front side of the vehicle, and the 'rear side' means a direction toward a rear side of the vehicle.

In various embodiments, at least one blade 120 is provided, and the blade 120 is disposed at a rear side in the duct housing 110 horizontally in a width direction of the vehicle.

Ends of the blade 120 are rotatably coupled to respective sides of the duct housing.

The knob 130 is mounted on one blade 120 among the blades so as to be slidable in the width direction of the vehicle and the front and rear direction of the vehicle, and adjusts angles of the blades 120.

Here, three blades 120 are provided to be spaced apart from each other in an up and down direction at the rear side of the duct housing 110 which is disposed in the interior of the vehicle.

Front ends of the blades 120, which are directed toward the front side of the vehicle, are rotatably connected through a connecting member 122.

In addition, the knob 130 may be mounted on the blade 120 disposed at a center among the blades 120.

The blades 120, which are configured as described above, are connected to each other by means of the connecting member 122. Therefore, when the user moves the knob 130 upward or downward, the angles of the blades 120 in the up and down direction are identically changed.

Further, the diffuser device 140 is mounted in the duct housing 110 at a position spaced apart from a front side of the blade 130 which is directed toward the front side of the vehicle, and the diffuser device 140 is connected with the knob 130.

The diffuser device 140 adjusts an angle in left and right directions and selectively diffuses the supplied air in accordance with a manipulation of the knob 130.

Here, as illustrated in FIG. 3, the diffuser device 140 includes a rotary link 142, a connecting rod 144, and fan assemblies 150.

In various embodiments, upper and lower portions of the rotary link 142 are rotatably mounted in the duct housing 110 at a front side of the knob 130, and the rotary link 142 is connected with the knob 130.

The rotary link 142 has a slot S formed in the up and down direction, and may be connected with the knob 130 in a state in which a mounting portion 132 formed at the front side of the knob 130 is inserted into the slot S.

The slot S may be formed to be rounded from the rear side toward the front side of the duct housing 110.

Therefore, when the user rotates the blade 120 in the up and down direction to adjust the angle of the blade 120 in the up and down direction, the knob 130 may be smoothly moved along the slot S.

In addition, when the knob 130 on the blade 120 is moved leftward or rightward in the width direction of the vehicle, the rotary link 142 may also be moved in the same direction as the knob 130.

In various embodiments, the connecting rod 144 is formed integrally with the rotary link 142 at the front side of the rotary link 142, and both end portions of the connecting rod 144 are formed to be bent toward the front side of the duct housing 110.

Here, respective ends of the connecting rod 144 may extend toward left and right sides in the width direction of the vehicle based on the rotary link 142.

In addition, both ends of the connecting rod 144 are formed to be bent corresponding to the fan assemblies 150. Further, connecting balls 146 may be formed integrally with both bent ends of the connecting rod 144, respectively.

The connecting balls 146 connect the fan assemblies 150 and the connecting rod 144, such that torque of the rotary link 142 is smoothly transmitted to the fan assemblies 150 through the connecting rod 144.

Therefore, the fan assemblies 150 may be rotated in the same direction as the rotary link 142, and the connecting balls 146 minimize friction that may occur when the fan assemblies 150 are rotated in the left and right directions.

Further, upper and lower portions of the fan assembly 150 are mounted in the duct housing 110 at the front side of the connecting rod 144 so as to be rotatable leftward and rightward based on the width direction of the vehicle.

The fan assemblies 150 are connected with the connecting rod 144 through the connecting balls 146.

As illustrated in FIG. 4, the fan assembly 150 includes an outer housing 152, a sliding housing 158, and fan blades 168.

First, central portions of upper and lower portions of the outer housing 152 are rotatably mounted in the duct housing 110. The outer housing 152 has at least one sliding groove 154 formed in an inner circumferential surface thereof.

In addition, at least one insertion groove 156 is formed along a circumference of the outer housing 152 at a front side of the outer housing 152.

Two sliding grooves 154 may be formed at each of the upper and lower sides of the inner circumferential surface of the outer housing 152 so as to be spaced apart from each other, and two sliding grooves 154 may be formed at each of the left and right sides of the inner circumferential surface of the outer housing 152 so as to be spaced apart from each other.

In addition, the insertion groove 156 may include an insertion portion 156a and a bent portion 156b.

The insertion portion 156a is formed in a straight line shape from the front side toward the rear side of the outer housing 152.

Further, the bent portion 156b is formed to be bent at a predetermined angle from the insertion portion 156a toward the rear side of the outer housing 152.

In the various embodiments, the sliding housing 158 is slidably inserted into the outer housing 152. The sliding housing 158 has at least one guide protrusion 162 formed on an outer circumferential surface corresponding to the sliding groove 154.

Two guide protrusions 162 may be formed at each of the upper and lower sides of the outer circumferential surface of the sliding housing 158 so as to be spaced apart from each other, and two guide protrusions 162 may be formed at each of the left and right sides of the outer circumferential surface of the sliding housing 158 so as to be spaced apart from each other, corresponding to the positions of the sliding grooves 154.

The sliding housing 158 has a boss portion 166 that is formed at a center of the sliding housing 158 and supported by a plurality of ribs 164 formed in a radial direction, and the boss portion 166 is connected to the connecting ball 146 of the connecting rod 144.

Eight ribs 164 are formed to be spaced apart from each other at an angle of 45° along the outer circumferential surface of the boss portion 166 One end of the rib 164 is integrally connected to the outer circumferential surface of the boss portion 166, and the other end of the rib 164 is integrally connected to an inner circumferential surface of the sliding housing 158.

Further, a plurality of fan blades 168 are provided, and upper and lower portions of a rear end of the fan blade 168 are rotatably connected to the inner circumferential surface of the sliding housing 158 and the boss portion 166, respectively, at the front side of the sliding housing 158, corresponding to each of the ribs 164.

An insertion protrusion 172 may integrally protrude from the fan blade 168 toward the outside of the sliding housing 158, corresponding to the insertion groove 156.

Eight fan blades 168 may be formed to be spaced apart from each other at an angle of 45° along the outer circumferential surface of the boss portion 166.

Therefore, the fan blades 168 are disposed at the same position as the ribs 164.

An operation of the diffuser device 150, which is configured as described above, will be described with reference to FIG. 5.

Figure 5:
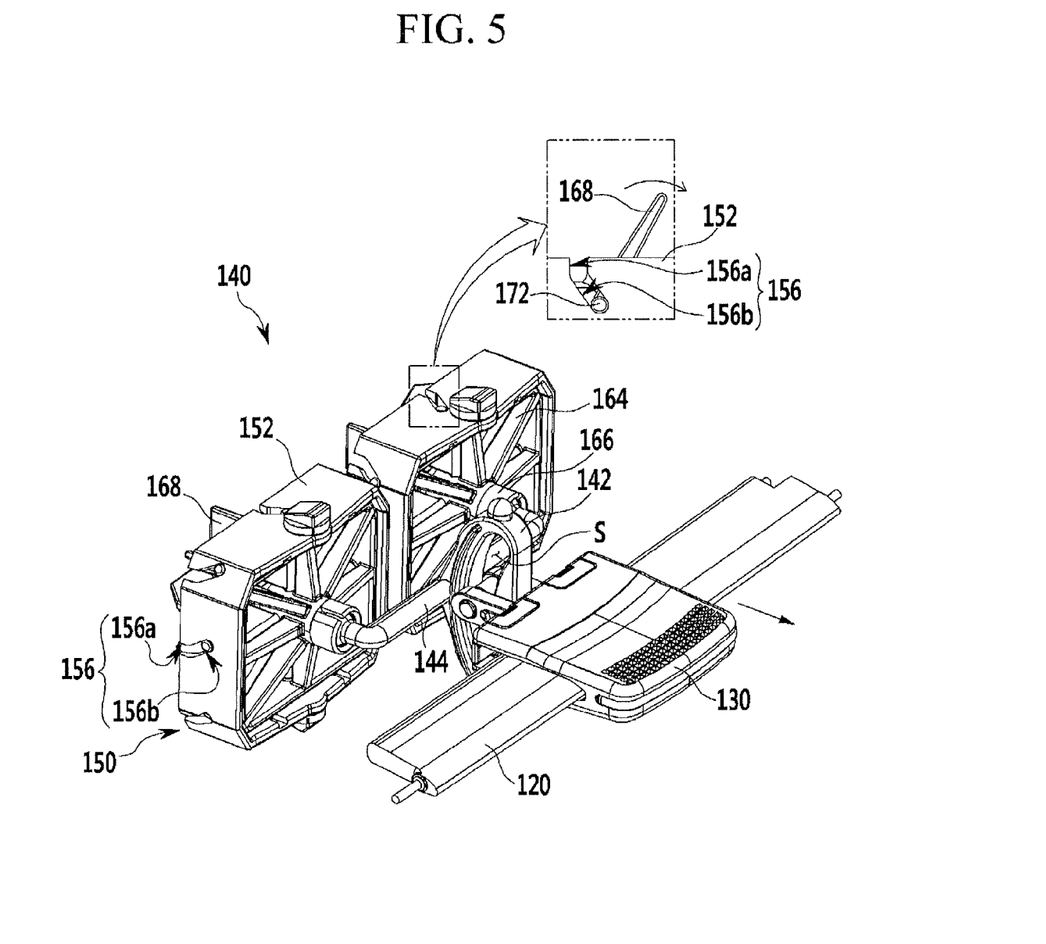
FIG. 5 is a view illustrating a state in which the diffuser device according to the present invention is operated.

FIG. 5 is a view illustrating a state in which the diffuser device according to various embodiments of the present invention is operated.

First, in the case of a concentration mode in which air supplied into the interior of the vehicle is directly supplied to a user, the user does not move the knob 130 rearward in the interior of the vehicle.

Then, as illustrated in FIG. 3, the fan blades 168 are positioned on the same line as the ribs 164, thereby concentrating the supplied air and then supplying the air to the interior of the vehicle.

Meanwhile, in the case of a diffusion mode in which air supplied into the interior of the vehicle is diffused, the user pulls the knob 130 rearward in the interior of the vehicle, as illustrated in FIG. 5.

Then, the sliding housing 158 protrudes to a certain degree from the outer housing 152 toward the rear side of the vehicle. At the same time, the fan blades 168 are moved together with the sliding housing 158.

At this time, the insertion protrusions 172 of the fan blades 168 are inserted into the bent portions 156b from the insertion portions 156a of the insertion grooves 156.

Therefore, front ends of the fan blades 168 are rotated about the rear ends of fan blades 168, which are rotatably connected to the sliding housing 158, toward one side in the width direction of the vehicle, such that angles of the fan blades 168 are changed.

Accordingly, the front ends of the fan blades 168 are positioned between the ribs 164 to diffuse the supplied air and then supply the air to the interior of the vehicle, thereby preventing air from being directly concentrated on the user.

Hereinafter, an operation and action of the air vent apparatus 100 for a vehicle according to various embodiments of the present invention, which is configured as described above, will be described in detail.

FIGS. 6A, 6B, 7A, and 7B are views illustrating states in which the air vent apparatus for a vehicle according to various embodiments of the present invention is operated at respective steps.

Figure 6A:
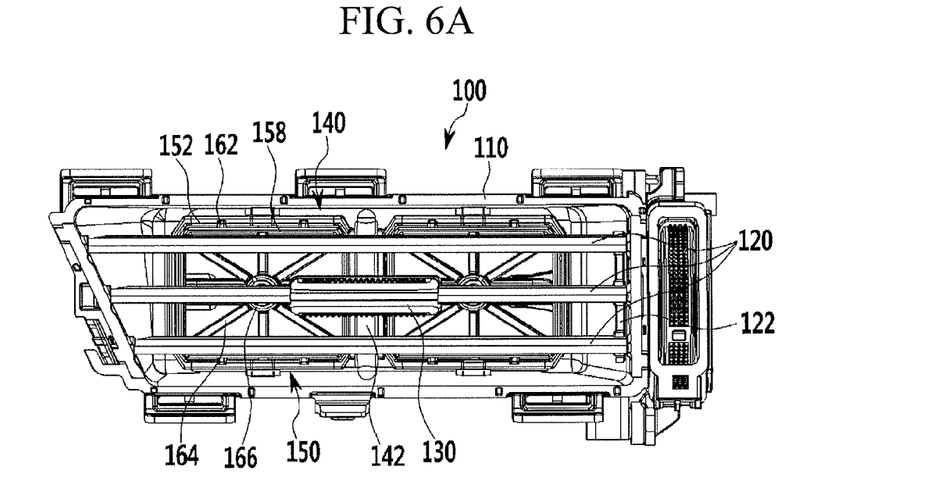
FIG. 6A, FIG. 6B, FIG. 7A and FIG. 7B are views illustrating states in which the exemplary air vent apparatus for a vehicle according to the present invention is operated at respective steps.
Figure 6B:
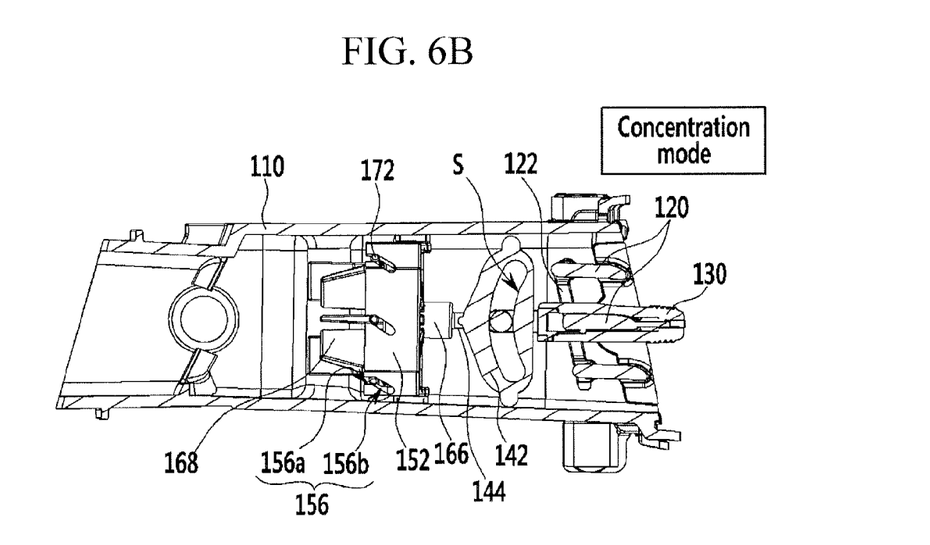

First, in the concentration mode in which the supplied air is supplied directly to the user, as illustrated in FIGS. 6A and 6B, the user adjusts the angles of the blades 120 and the angles of the fan assemblies 150 by manipulating the knob 130 only in the up and down direction, or only in the left and right direction.

In this case, the user does not pull the knob 130 toward the rear side of the vehicle, such that the sliding housing 158 does not protrude rearward from the outer housing 152.

Therefore, the fan blades 168 are positioned on the same line as the ribs 164, such that the supplied air is concentrated to the user, and the same amount of air is provided to the user.

Figure 7A:
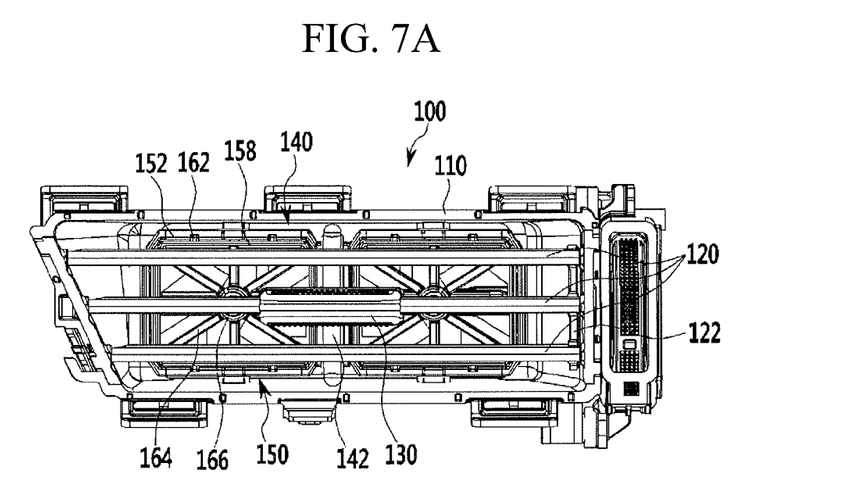
Figure 7B:
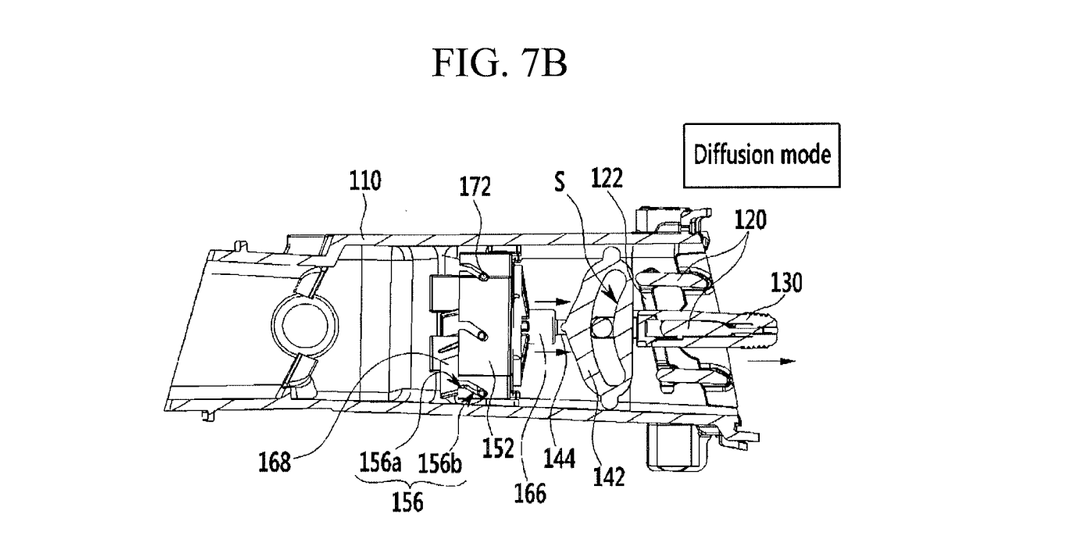

In contrast, in the diffusion mode in which the supplied air is diffused and supplied to the user, as illustrated in FIGS. 7A and 7B, the user adjusts the angles of the blades 120 and the angles of the fan assemblies 150 by manipulating the knob 130 in the up and down direction and the left and right direction, and then pulls the knob 130 toward the rear side of the vehicle.

Then, the sliding housing 158 protrudes to a certain degree toward the rear side of the vehicle from the outer housing 152 by the rotary link 142 and the connecting rod 144 that are moved toward the interior of the vehicle together with the knob 130.

The fan blades 168 are moved together with the sliding housing 158 such that the insertion protrusions 172 are inserted into the bent portions 156b from the insertion portions 156a of the insertion grooves 156.

Therefore, the front ends of the fan blades 168 are rotated about the rear ends of the fan blades 168, which are rotatably connected to the sliding housing 158, toward one side in the width direction of the vehicle, such that angles of the fan blades 168 are changed.

The front ends of the fan blades 168 are then positioned between the ribs 164 to prevent the supplied air from being concentrated and to diffuse the supplied air and then supply the air to the interior of the vehicle, thereby preventing air from being concentrated on the user.

Therefore, when the air vent apparatus 100 for a vehicle according to various embodiments of the present invention, which is configured as described above, is applied, it is possible to make the user feel comfortable and improve convenience in use, by concentrating or diffusing and supplying air including cold air or warm air at the front side of the user through a simple manipulation of the knob by the user, and by adjusting various discharge directions.

In addition, it is possible to diffuse and discharge the supplied air using the diffuser device 140 connected with the knob 130 without providing a separate diffusion device, thereby reducing costs and improving marketability of the air vent apparatus 100.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An air vent apparatus for a vehicle, which is disposed to supply air including cold air or warm air into an interior of a vehicle, the air vent apparatus comprising:
    a duct housing opened at front and rear sides thereof;
    at least one blade disposed at a rear side in the duct housing horizontally in a width direction of the duct housing, and having both ends rotatably coupled;
    a knob mounted on one blade among the at least one blade so as to be slidable in the width direction of the vehicle and a front and rear direction of the duct housing, and capable of adjusting an angle of the blade; and
    a diffuser device mounted in the duct housing at a position spaced apart from a front side of the blade, connected with the knob, adjusting an angle in a left and right direction, and selectively diffusing the supplied air in accordance with a manipulation of the knob,
    wherein the diffuser device includes:
        a rotary link having upper and lower portions that are rotatably mounted in the duct housing at a front side of the knob, and connected with the knob;
        a connecting rod formed integrally with the rotary link at a front side of the rotary link, and having both end portions formed to be bent toward the front side of the duct housing; and
        fan blade assemblies having upper and lower portions that are rotatably mounted in the duct housing at a front side of the connecting rod, and are connected with the connecting rod.

2. The air vent apparatus of claim 1, wherein three blades are provided to be spaced apart from each other in a vertical direction at the rear side in the duct housing, front ends of the blades are rotatably connected through a connecting member, and the knob is mounted on the blade disposed at a center.

3. The air vent apparatus of claim 1, wherein the rotary link includes a slot formed in the vertical direction, and the rotary link is connected with the knob in a state in which a mounting portion formed at the front side of the knob is inserted into the slot.

4. The air vent apparatus of claim 3, wherein the slot is formed to be rounded from the rear side toward the front side of the duct housing.

5. The air vent apparatus of claim 1, wherein both ends of the connecting rod, which are based on the rotary link, extend toward left and right sides in the width direction of the vehicle, respectively.

6. The air vent apparatus of claim 1, wherein both ends of the connecting rod are formed to be bent corresponding to the fan blade assemblies, and connecting balls are formed integrally with both bent ends of the connecting rod.

7. The air vent apparatus of claim 6, wherein when the knob is in a home position, the fan blade is positioned on a same line as the rib, and is configured to concentrate the supplied air and then supply the air into an interior of the vehicle.

8. The air vent apparatus of claim 6, wherein eight ribs are formed to be spaced apart from each other at an angle of 45° along an outer circumferential surface of a boss portion.

9. The air vent apparatus of claim 6, wherein eight fan blades are formed to be spaced apart from each other at an angle of 45° along an outer circumferential surface of a boss portion.

10. The air vent apparatus of claim 1, wherein the fan blade assembly includes:
    an outer housing having central portions of upper and lower portions rotatably mounted in the duct housing, at least one sliding groove formed in an inner circumferential surface thereof, and at least one insertion groove formed along a circumference at a front side of the outer housing;
    a sliding housing slidably inserted into the outer housing, and having at least one guide protrusion formed on an outer circumferential surface corresponding to the sliding groove, and a boss portion formed at a center of the sliding housing, supported by a plurality of ribs formed in a radial direction, and connected to the connecting rod; and
    a plurality of fan blades having upper and lower portions at a rear end thereof that is rotatably connected to the inner circumferential surface of the sliding housing and the boss portion, respectively, at the front side of the sliding housing, corresponding to the ribs, respectively, and having insertion protrusions that integrally protrude toward the outside of the sliding housing, corresponding to the insertion grooves.

11. The air vent apparatus of claim 10, wherein the insertion groove includes:
    an insertion portion formed in a straight line shape from the front side toward the rear side of the outer housing; and
    a bent portion formed to be bent at a predetermined angle from the insertion portion toward the rear side of the outer housing.

12. The air vent apparatus of claim 11, wherein, when the knob is pulled rearward in the interior of the vehicle, the fan blade is configured to be moved together with the sliding housing that is moved to a predetermined degree from the outer housing toward the rear side of the vehicle, an angle of a front end of the fan blade is changed in the width direction of the vehicle as the insertion protrusion is rotated while being inserted into the bent portion from the insertion portion, and the supplied air is diffused and then supplied into the interior of the vehicle.

* * * * *